United States Patent
Huijzer

(10) Patent No.: US 12,140,461 B2
(45) Date of Patent: Nov. 12, 2024

(54) METHOD FOR OPERATING AN ULTRASONIC FLOWMETER AND ULTRASONIC FLOWMETER

(71) Applicant: KROHNE AG, Basel (CH)

(72) Inventor: Arie Huijzer, Sliedrecht (NL)

( * ) Notice: Subject to any disclaimer, the term of this patent is extended or adjusted under 35 U.S.C. 154(b) by 659 days.

(21) Appl. No.: 17/447,244

(22) Filed: Sep. 9, 2021

(65) Prior Publication Data
US 2022/0074773 A1  Mar. 10, 2022

(30) Foreign Application Priority Data
Sep. 10, 2020  (DE) .......................... 102020123653.0

(51) Int. Cl.
*G01F 1/667* (2022.01)
*G01F 1/66* (2022.01)

(52) U.S. Cl.
CPC .............. *G01F 1/667* (2013.01); *G01F 1/662* (2013.01)

(58) Field of Classification Search
CPC . G01F 1/667; G01F 1/662; G01F 1/66; G01F 25/10; G01P 5/245
See application file for complete search history.

(56) References Cited

U.S. PATENT DOCUMENTS

| | | | |
|---|---|---|---|
| 3,978,727 A * | 9/1976 | Griverus | G01F 15/024 73/861.03 |
| 4,527,433 A | 7/1985 | Gutterman | |
| 2019/0118224 A1 | 4/2019 | Kastelein et al. | |
| 2019/0128715 A1 * | 5/2019 | Cawte | G01F 25/10 |

FOREIGN PATENT DOCUMENTS

| | | | |
|---|---|---|---|
| AU | 2007277095 A1 | 1/2008 | |
| DE | 4315725 A1 | 11/1994 | |
| DE | 102015210732 A1 | 12/2016 | |
| EP | 2069723 A1 | 6/2009 | |
| EP | 4332517 A1 * | 3/2024 | ............. G01F 1/662 |
| WO | 2008013957 A1 | 1/2008 | |
| WO | 2017187146 A1 | 11/2017 | |
| WO | 2019042288 A1 | 3/2019 | |

OTHER PUBLICATIONS

Jameson, Brant, et al.; "Estimation and Detection in the Presence of Ringing Noise"; IEEE 2010 International Ultrasonics Symposium; San Diego, CA; Oct. 11, 2010; 5 Pages.

* cited by examiner

*Primary Examiner* — Shelby A Turner
*Assistant Examiner* — Yaritza H Perez Bermudez
(74) *Attorney, Agent, or Firm* — Patrick D. Duplessis

(57) ABSTRACT

A method for operating an ultrasonic flowmeter includes: capturing at least one first ringing signal of a first ultrasonic transducer of the ultrasonic flowmeter, and detecting a first ringing debugging signal based on the at least one captured first ringing signal; emitting a first measurement signal into a medium through the first ultrasonic transducer, resulting in a first ringing measurement signal in the first ultrasonic transducer; receiving a measurement signal as a first received signal by the first ultrasonic transducer, wherein the first received signal and the first ringing measurement signal are superimposed to form a first superimposed signal; determining a first correction signal by subtracting the first ringing debugging signal from the first superposition signal; and determining the flow velocity or flow rate of the medium based on the first correction signal.

14 Claims, 5 Drawing Sheets

METHOD FOR OPERATING AN ULTRASONIC FLOWMETER AND ULTRASONIC FLOWMETER

TECHNICAL FIELD

The invention is based on a method for operating an ultrasonic flowmeter, wherein the ultrasonic flowmeter has at least one first ultrasonic transducer, wherein the first ultrasonic transducer is designed as a transmitting unit and as a receiving unit, and a measuring tube, wherein a medium flows through the measuring tube during operation, and a control and evaluation unit for controlling at least the first ultrasonic transducer and for determining the flow velocity or the flow rate of the medium. Furthermore, the invention relates to an ultrasonic flowmeter having at least one first ultrasonic transducer, wherein the first ultrasonic transducer is designed as a transmitting unit and as a receiving unit, and having a measuring tube, wherein a medium flows through the measuring tube during operation, and having a control and evaluation unit for controlling at least the first ultrasonic transducer and for determining the flow velocity or the flow rate of the medium.

BACKGROUND

During operation of such an ultrasonic flowmeter, the flow rate of a medium through the measuring tube is determined based on the difference in transit time of a measuring signal passing through the medium in the direction of flow and a measuring signal passing through the medium against the direction of flow. However, when an ultrasonic transducer emits a measurement signal into the medium, only a small portion of the energy is actually emitted into the medium. Due to reflections within the ultrasonic transducer as well as continuous vibrations, an undesired interference signal, the ringing signal, occurs in the ultrasonic transducer, which only gradually decreases over time.

In the case considered here, in which the at least one ultrasonic transducer operates alternately as a transmitting unit and then as a receiving unit, the situation can now arise in which the received measurement signal is superimposed by the ultrasonic transducer's own ringing signal, whereby in particular the zero crossing of the measurement signal, which is relevant for detecting the transit time, is shifted, whereby the transit time measurement is subject to error. The superimposition of the received signal with the ringing signal thus has a negative effect on the measurement accuracy.

In the prior art, it is known that to avoid superimposition of the ultrasonic transducer's own ringing signal on the received measurement signal, the time offset between transmission of the measurement signal and reception of a measurement signal is measured in such a way that it is ensured that the transducer's own ringing signal has already subsided.

However, this method has the disadvantage that the repetition rate of the flow measurement is limited. In addition, the flow rate may change within a measurement interval, i.e., in the time between emitting a measurement signal and receiving a measurement signal, which also has a negative effect on the measurement accuracy.

In addition to the approach of increasing the time between emitting and receiving a measurement signal, it is also known to incorporate a material that absorbs the ringing signal into the ultrasonic transducer.

In addition, other approaches are known from the prior art by which interference of the received signal by the ringing signal is to be avoided.

An ultrasonic flowmeter is known from the publication DE 43 15 725 A1, wherein the repetition frequency of the emission of the transmission signal of a particular transducer is randomly varied and averaged over several received signals associated with these transmitted signals in order to eliminate interference signals coming from the decay of the transducers.

The publication "Estimation and Detection in the Presence of Ringing Noise" by Brant Jameson and Roberto Manduchi (DOI: 10.1109/ULTSYM.2010.5935877) concerns an ultrasonic transducer that emits a measurement signal to detect objects and receives this measurement signal again after reflection from the object. In order to eliminate the ringing signal, which is generated by emitting the transmitted signal, a ringing signal is estimated and this ringing signal is subtracted from the received signal.

An ultrasonic flowmeter with two ultrasonic transducers is known from the publication WO 2017/187146 A1, wherein the phase of a measurement signal is varied so that the interfering ringing signal can be determined out after averaging over several measurements.

In addition, an ultrasonic flowmeter is known from the disclosure WO 2019/042288 A1, wherein an ultrasonic transducer is excited with different waveforms to damp the oscillations of the ultrasonic transducer.

SUMMARY

Based on the aforementioned prior art, it is an object of the invention to provide a method for operating an ultrasonic flowmeter with which the accuracy of the flow measurement can be increased. Furthermore, it is an object of the invention to provide an ultrasonic flowmeter for carrying out the method according to the invention.

According to a first teaching of the invention, the object described above is achieved by a method mentioned at the beginning in that the method comprises the following steps:

capturing at least one first ringing signal of the first ultrasonic transducer and determining a first ringing debugging signal based on the at least one captured first ringing signal, emitting a first measurement signal into the medium by the first ultrasonic transducer, resulting in a first ringing measurement signal in the first ultrasonic transducer, receiving a measurement signal as a first received signal by the first ultrasonic transducer, wherein the first received signal and the first ring measurement signal are superimposed to form a first superimposed signal, determining a first correction signal by subtracting the first ringing debugging signal from the first superposition signal, and determining the flow velocity or flow rate based on the first correction signal.

The method according to the invention is divided into two measuring parts. In a measuring part A, at least one ringing signal characteristic of the at least one ultrasonic transducer is first captured by measurement. Based on this at least one measured ringing signal, a first ringing debugging signal is determined. This ringing debugging signal is stored in the control and evaluation unit and is taken into account in the subsequent measuring part B when determining the flow velocity or the flow rate.

The subsequent measuring part B concerns the measurement of the flow velocity or the flow rate, wherein by subtracting the first ringing debugging signal from the first superimposed signal, the overlay with the first ringing measurement signal is eliminated or at least minimized.

In this respect, the ringing measurement signal occurring during the measurement is an actual signal that is not captured by measurement, but whose influence on the received signal is eliminated or minimized by the subtraction of the ringing debugging signal.

In contrast to the methods known from the prior art, the correction of the superposition signal according to the invention is not based on a blanket estimation and/or blanket elimination of the ringing signal. Rather, according to the invention, determination of the ringing debugging signal based on measurement takes into account that ringing signals are variable and, moreover, also characteristic of different ultrasonic transducers.

As a result, the corrected correction signal essentially corresponds to the received signal, which enables a particularly accurate transit time determination of the measurement signal. As a consequence, the measurement accuracy of the ultrasonic flowmeter is particularly high due to the method according to the invention.

In principle, the measurement signal received by the first ultrasonic transducer can be the measurement signal emitted by this ultrasonic transducer. In this case, the measurement signal is reflected within the measuring tube in such a way that the measurement signal passes through the medium both in the direction of flow and against the direction of flow. As a reflection element, for example, a second ultrasonic transducer is present, which is designed as a receiver, so that the transit time of the measurement signal can be determined at the reflection point.

Furthermore, the received measurement signal can also be a measurement signal emitted by another ultrasonic transducer.

According to an advantageous embodiment of the method according to the invention, the ultrasonic flowmeter comprises at least a first ultrasonic transducer and a second ultrasonic transducer, wherein the first and the second ultrasonic transducer are each configured as a transmitting unit and as a receiving unit, and wherein the first and the second ultrasonic transducer are arranged on the measuring tube offset with respect to each other in the flow direction, wherein the method comprises the following steps:
capturing at least one first ringing signal of the first ultrasonic transducer and determining a first ringing debugging signal based on the at least one captured first ringing signal and/or
capturing at least one second ringing signal of the second ultrasonic transducer and determining a second ringing debugging signal based on the at least one captured second ringing signal,
emitting a first measurement signal into the medium by the first ultrasonic transducer, thereby producing a first ringing measurement signal in the first ultrasonic transducer,
emitting a second measurement signal into the medium through the second ultrasonic transducer, whereby a second ringing measurement signal is produced in the second ultrasonic transducer,
receiving the second measurement signal as a first received signal by the first ultrasonic transducer, wherein the first received signal and the first ringing measurement signal are superimposed to form a first superimposed signal,
receiving the first measurement signal as a second received signal by the second ultrasonic transducer,
wherein the second received signal and the second ringing measurement signal are superimposed to form a second superimposed signal,
determining a first correction signal by subtracting the first ringing debugging signal from the first superimposed signal, and/or
determining a second correction signal by subtracting the second ringing debugging signal from the second superimposed signal, and
determining the flow velocity or flow rate based on the first and/or the second correction signal.

If at least two ultrasonic transducers for measuring the flow velocity or the flow rate are provided, each operating as a transmitting unit and as a receiving unit, and wherein the flow velocity or the flow rate is determined by taking into account the ringing debugging signals from both ultrasonic transducers, then the measurement accuracy of such an ultrasonic flowmeter can be further increased.

In addition, it is also conceivable that the correction according to the invention for its own ringing debugging signal is only carried out for one ultrasonic transducer.

According to a further design, the ultrasonic flowmeter has more than two ultrasonic transducers, with the previously described method being carried out on one ultrasonic transducer pair at a time.

The initial determination of the ringing signal by measurement and the subsequent consideration of the ringing debugging signal in the determination of the flow velocity or flow rate has the further advantage that the repetition rate of individual flow measurements is not influenced, so that this can be particularly high.

According to a preferred design, the first ultrasonic transducer and the second ultrasonic transducer emit the first measurement signal and the second measurement signal substantially simultaneously. This design of the method has the advantage that the measured transit times of the measurement signals, which pass through the medium in and against the direction of flow, can take place simultaneously, so that, in particular, constant process conditions can be ensured. Process conditions that vary over time, such as pressure fluctuations and/or temperature fluctuations and/or fluctuations in flow velocity, do not influence the determination of the flow rate according to this design. In this context, substantially simultaneous means that the first and the second measurement signals are emitted with a time offset of less than half the time interval between emitting two measurement signals from an ultrasonic transducer, in particular of less than 500 µs, particularly preferably with a time offset of between 0 and 1 µs. According to a further preferred design, the first and the second measurement signals are emitted without time offset.

According to an alternative design, the emitting the first and the second measurement signal is sequential, i.e., the second ultrasonic transducer emits the second measurement signal only after it has received the first measurement signal. Also in this design, it is advantageous to consider the ringing signal from at least one ultrasonic transducer when determining the flow rate to increase the measurement accuracy.

In principle, the first and/or the second ringing debugging signal can be a fixed, unchanging ringing debugging signal, or the first and/or the second ringing debugging signal can be adapted to the variation of process condition and/or status changes of the respective ultrasonic transducer in the course of a measurement.

According to one design of the method, the first ringing debugging signal corresponds to a first ringing signal captured once, before measurement, in particular during commissioning, wherein the ringing signal of the first ultrasonic transducer is captured by measurement immediately after emitting a first measurement signal. Alternatively or additionally, the second ringing debugging signal corresponds to a second ringing signal captured once, before measurement, in particular during commissioning, wherein the ringing signal of the second ultrasonic transducer is captured by measurement immediately after emitting a second measurement signal.

According to a next advantageous design, the first ringing debugging signal of the first ultrasonic transducer and/or the second ringing debugging signal of the second ultrasonic transducer is updated at regular or irregular intervals during a measurement.

For example, the ringing signal of the first ultrasonic transducer can be captured again by measurement in the course of measurement, preferably using a point in time at which the second ultrasonic transducer does not generate any measurement signals, wherein the updated first ringing debugging signal corresponds to the newly captured first ringing signal. Alternatively or additionally, the ringing signal of the second ultrasonic transducer can be captured again by measurement in the course of the measurement, preferably using a point in time at which the first ultrasonic transducer does not generate any measurement signals, wherein the updated second ringing interference signal corresponds to the newly captured second ringing signal.

According to a further design, the first ringing debugging signal corresponds to an averaging of a plurality of individual measurements of first ringing signals of the first ultrasonic transducer and/or the second ringing debugging signal corresponds to an averaging of a plurality of individual measurements of second ringing signals of the second ultrasonic transducer.

To determine the first ringing debugging signal, a plurality of individual measurements of the first ringing signal of the first ultrasonic transducer are captured by measurement prior to the measurement, preferably under process conditions, and an averaging of the captured signals is determined. Alternatively or additionally, in order to determine the second ringing debugging signal, a plurality of individual measurements of the second ringing signal of the second ultrasonic transducer are captured by measurement prior to the measurement, preferably under process conditions, and an averaging of the captured signals is determined.

According to one design, as already stated above, the first ringing debugging signal of the first ultrasonic transducer and/or the second ringing debugging signal of the second ultrasonic transducer is updated at regular or irregular intervals during a measurement.

Particularly preferably, for updating the first ringing debugging signal, the first ringing signal is newly captured during a measurement and the averaging of several individual measurements is newly determined taking into account the newly captured first ringing signal, preferably the newly captured first ringing signal is particularly highly weighted, and/or for updating the second ringing debugging signal, the second ringing signal is newly captured during a measurement and the averaging over several individual measurements is newly determined taking into account the newly captured second ringing signal, preferably the newly captured second ringing signal is particularly highly weighted.

For example, the first ringing debugging signal can be updated by averaging the newly captured first ringing signal with the previous first ringing debugging signal, wherein preferably the newly captured first ringing signal is weighted higher than the previous first ringing debugging signal and/or the second ringing debugging signal can be updated thereby, that the newly captured second ringing signal is averaged with the previous second ringing debugging signal, preferably the newly captured second ringing signal is weighted higher than the previous second ringing debugging signal.

The previously described updating of the ringing debugging signal or signals has the advantage that, in particular, variations resulting from current changes in the process conditions are taken into account in the determination of the first or the second ringing debugging signal, preferably with a high weighting. According to one design, the newly captured first and/or second ringing signals are weighted higher than all other signals entering the averaging when determining the averaging over a plurality of individual measurements.

According to a further design, the averaging of the first ringing signals of the first ultrasonic transducer and/or the averaging of the second ringing signals of the second ultrasonic transducer always takes into account a fixed number of ringing signals that enter the averaging. Thus, if a newly determined first or second ringing signal is taken into account in the averaging, another first or second ringing signal is removed from the averaging for this purpose.

According to a further design of the method according to the invention, the at least one newly captured first ringing signal of the first ultrasonic transducer and/or the at least one newly captured second ringing signal of the second ultrasonic transducer is evaluated, in particular with regard to changes in process conditions and/or the type and/or the state of the first and/or the second ultrasonic transducer.

For example, the newly captured first ringing signal may be compared to the first ringing debugging signal and/or the newly captured second ringing signal may be compared to the second ringing debugging signal. Deviations between the captured first ringing signal and the first ringing debugging signal or between the captured second ringing signal and the second ringing debugging signal may indicate changes in the process conditions and/or or changes in the state of the respective ultrasonic transducer.

Particularly preferably, a corresponding message is output to the user if there is a deviation between the newly captured first ringing signal and the ringing debugging signal or between the newly captured second ringing signal and the ringing debugging signal, taking into account a tolerance range.

This design has the advantage that the actually undesired ringing signal can be used in an advantageous manner for monitoring the measurement process or the state of an ultrasonic transducer or also for detecting the type of ultrasonic transducer.

Particularly preferably, a frequency analysis, in particular by means of a Fast Fourier Transformation (FFT), of the at least one newly captured first ringing signal and/or of the at least one newly captured second ringing signal is carried out, wherein at least one comparison parameter is derived from the frequency spectrum of the first ringing signal and/or from the frequency spectrum of the second ringing signal, and wherein the value of the comparison parameter is compared with values stored in the control and evaluation unit for the first ringing signal and/or for the second ringing signal.

According to one design, one comparison parameter is the amplitude of specified frequencies. A change in the amplitude of these frequencies in the course of a measurement may be due to changes in the vibration behavior of the ultrasonic transducer and, in this respect, may indicate, for example, aging of the ultrasonic transducer.

Another comparison parameter is, for example, the value of the frequency that has the maximum amplitude.

According to a further design, at least one comparison parameter is derived directly from the measured ringing signal or a plurality of characteristic comparison parameters are derived, which are combined in a matrix. According to this embodiment, the matrix itself and/or values characterizing the matrix, such as the determinant of the matrix, are compared with reference values stored in the control and evaluation unit. Particularly preferably, the reference values are determined based on at least one measurement of the first ringing signal and/or the second ringing signal prior to flow measurement, particularly preferably during commissioning of the flowmeter.

According to a further design, in the course of a measurement, the first ringing signal of the ultrasonic transducer and/or the second ringing signal of the second ultrasonic transducer is captured anew at regular or irregular intervals independently of the updating of the first and/or the second ringing debugging signal and evaluated with regard to changes in the respective ringing signal.

Despite the correction of the first and/or the second superimposed signal for the first and/or the second ringing debugging signal, it is possible that the first and/or the second correction signal still has an interference signal whose amplitude is substantially smaller than the amplitude of the ringing measurement signal, but which nevertheless has an effect on the measurement accuracy. In detail, according to this design, the first correction signal has a first interference signal and/or the second correction signal has a second interference signal.

This first or second interference signal can be eliminated or at least reduced by the first ultrasonic transducer receiving the measurement signal with a varying time offset ±T during the course of the measurement, so that the first interference signal overlays the first correction signal both positively and negatively at the same points during the course of the measurement, and/or by the second ultrasonic transducer receiving the measurement signal with a varying time offset ±T during the course of the measurement, so that the second interference signal overlays the second correction signal both positively and negatively at the same points during the course of the measurement.

For this, according to one design, the first ultrasonic transducer emits the first measurement signal with a varying time offset ±T with respect to the transmission of the second measurement signal, so that the first measurement signal has a time offset ±T with respect to the second ringing measurement signal of the second ultrasonic transducer and/or the second ultrasonic transducer emits the second measurement signal with a varying time offset ±T with respect to the transmission of the first measurement signal, so that the second measurement signal has a time offset ±T with respect to the first ringing measurement signal of the first ultrasonic transducer.

Particularly preferably, exactly one ultrasonic transducer of the ultrasonic transducer pair emits the measurement signal with varying time offset during a measurement. If both ultrasonic transducers emit their measurement signals with a varying time offset, the ultrasonic transducers are controlled such that they do not simultaneously emit their measurement signals with a varying time offset. Rather, during a first measurement period, the first ultrasonic transducer emits the first measurement signal with a varying time offset and during a second measurement period, the second ultrasonic transducer emits the second measurement signal with a varying time offset.

Particularly preferably, the first ultrasonic transducer emits the first measurement signal alternately delayed, i.e., with positive time offset +T, and temporally before the second ultrasonic transducer, i.e., with negative time offset −T. According to an alternative design, the second ultrasonic transducer emits the second measurement signal alternately delayed, i.e., with positive time offset +T, and temporally before the first ultrasonic transducer, i.e., with negative time offset −T.

According to a particularly preferred design, the time offset T between emitting the first and the second measurement signal corresponds to half a period of the first or the second measurement signal, respectively.

According to a next design, the time offset T between emitting the first and the second measurement signal is approximately 1 ms.

The previously described designs have the further advantage that the remaining first or second interference signal averages out in the course of the measurement due to the both positive and negative superimposition with the correction signal.

According to a second teaching of the present invention, the object described at the beginning is achieved by an ultrasonic flowmeter having at least a first ultrasonic transducer, wherein the first ultrasonic transducer is designed as a transmitting unit and as a receiving unit, and having a measuring tube, with a medium flowing through the measuring tube during operation, and having a control and evaluation unit for controlling at least the first ultrasonic transducer and for determining the flow velocity or the flow rate of the medium, characterized in that the ultrasonic flowmeter is designed to carry out one of the methods described above during operation.

Particularly preferably, the ultrasonic flowmeter has at least one first ultrasonic transducer and one second ultrasonic transducer, wherein the first and the second ultrasonic transducer are each designed as a transmitting unit and as a receiving unit, and wherein the first and the second ultrasonic transducer are arranged on the measuring tube offset with respect to one another in the direction of flow.

If at least two ultrasonic transducers are present, it is particularly preferred if the superimposed signals from both ultrasonic transducers are corrected for the ultrasonic transducer's own ringing signals in order to increase the measurement accuracy.

BRIEF DESCRIPTION OF THE DRAWINGS

In detail, there is now a plurality of possibilities for designing and further developing the method according to the invention and the ultrasonic flowmeter according to the invention. For this, reference is made to the following description of preferred embodiments in conjunction with the drawings.

DETAILED DESCRIPTION

Figure 1:
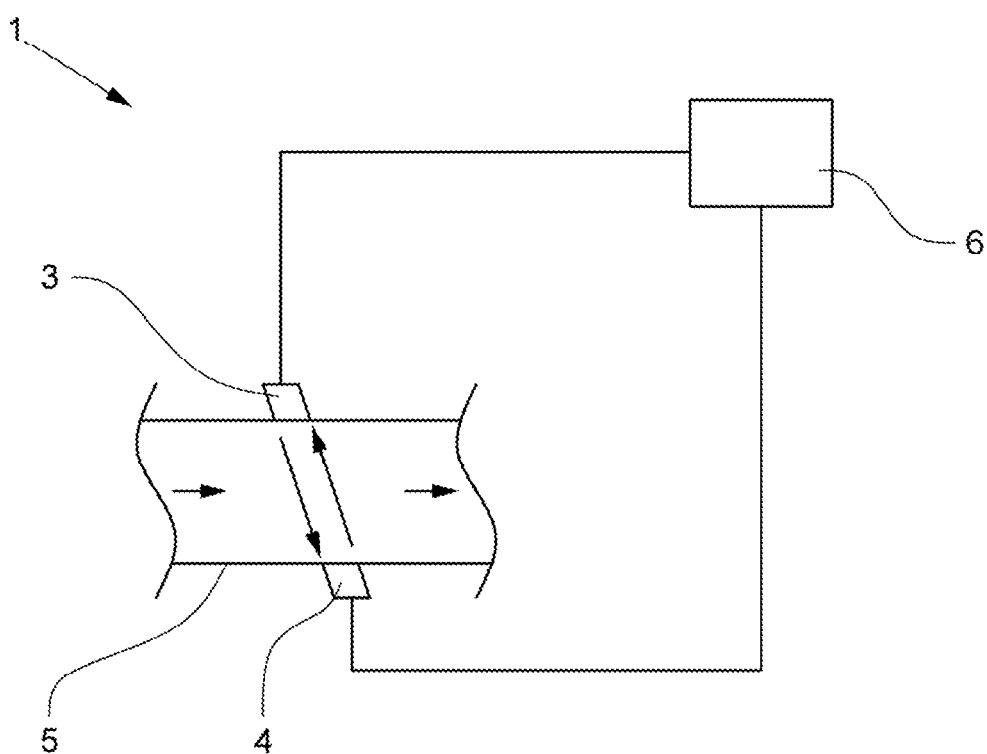
FIG. 1 illustrates a first embodiment of an ultrasonic flowmeter according to the invention.

FIG. 1 shows an embodiment of an ultrasonic flowmeter 1, wherein the ultrasonic flowmeter 1 comprises a pair of ultrasonic transducers consisting of a first ultrasonic transducer 3 and a second ultrasonic transducer 4. The ultrasonic transducers 3 and 4 are arranged offset from each other in the direction of flow on a measuring tube 5. In the illustrated embodiment, the flow direction is shown by arrows.

Both ultrasonic transducers 3 and 4 are designed both as a transmitting unit and as a receiving unit. During operation, the second ultrasonic transducer 4 receives the first measurement signal emitted by the first ultrasonic transducer 3, and the first ultrasonic transducer 3 receives the second measurement signal emitted by the second ultrasonic transducer 4. As a result, one measurement signal runs in the direction of flow and one measurement signal runs against the direction of flow during operation. The flow velocity and the flow rate of the medium through the measuring tube 5 can be determined from the difference in transit time. In the illustrated embodiment, the first ultrasonic transducer 3 is arranged to emit the first measurement signal in the direction of flow and the second ultrasonic transducer 4 is arranged to emit the second measurement signal against the direction of flow.

In addition, the ultrasonic flowmeter 1 has a control and evaluation unit 6 that is connected to the first ultrasonic transducer 3 and the second ultrasonic transducer 4. The control and evaluation unit 6 controls the ultrasonic transducers 3 and 4 and further determines the flow rate of the medium from the transit times of the measurement signals. In the embodiment shown, the control and evaluation unit 6 is designed to carry out a method 2 according to the invention, according to which the superimposed signals 15 generated at the ultrasonic transducers 3 and 4, which have an overlap of the received signals with their own ringing measurement signals, are cleaned of the ringing debugging signals 16. As a result, the ultrasonic flowmeter 1 shown has a particularly high measurement accuracy.

Figure 2:
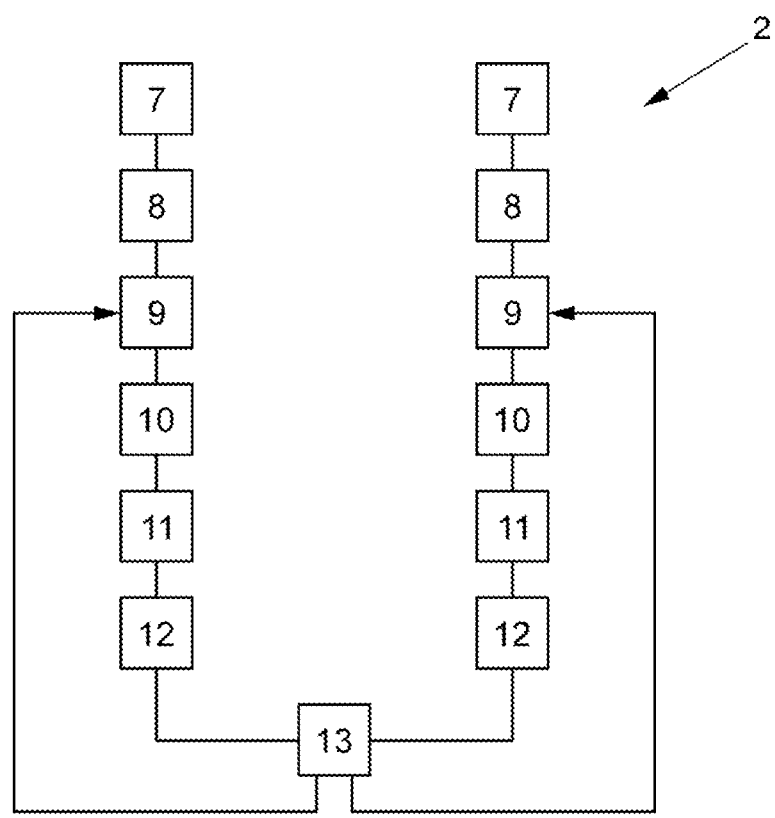
FIG. 2 illustrates an embodiment of a method according to the invention.

FIG. 2 shows a first embodiment of a method 2 according to the invention for operating an ultrasonic flowmeter 1. The ultrasonic flowmeter 1 is designed according to the embodiment shown in FIG. 1.

The illustrated method 2 comprises the following steps, wherein the individual method steps for the first ultrasonic transducer 3 and the second ultrasonic transducer 4 are shown separately:

First, a first ringing signal of the first ultrasonic transducer 3 is captured 7 and, based on the first ringing signal, a first ringing debugging signal 16 is determined 8. In the illustrated embodiment, the first ringing debugging signal 16 corresponds to the first captured ringing signal. This first ringing debugging signal 16 is stored in the control and evaluation unit 6 and used in the evaluation of the received measurement signals.

In addition, a second ringing signal of the second ultrasonic transducer 4 is captured 7 and, based on the second ringing signal, a second ringing debugging signal 16 is detected 8. In the illustrated embodiment, the second ringing debugging signal 16 corresponds to the second captured ringing signal. This second ringing debugging signal 16 is also stored in the control and evaluation unit 6 and is used in the evaluation of the received measurement signals.

In a next step 9 the first ultrasonic transducer 3 emits a first measurement signal into the medium, wherein a first ringing measurement signal is generated in the first ultrasonic transducer 3 by reflections and continuing vibrations. At substantially the same time, the second ultrasonic transducer 4 emits a second measurement signal into the medium, wherein a second ringing measurement signal is generated in the second ultrasonic transducer 4 by reflections and continuous vibrations.

Subsequently, the first ultrasonic transducer 3 receives 10 the second measurement signal as a first received signal. The first received signal is superimposed 11 with the first ringing measurement signal to form a first superimposed signal 15.

The second ultrasonic transducer 4 receives the first measurement signal as a second received signal. The second received signal is superimposed 11 with the second ringing measurement signal to form a second superimposed signal 15.

In a next step, a first correction signal 17 is determined 12 for the first ultrasonic transducer 3 by subtracting the first ringing debugging signal 16 from the first superposition signal 15.

In addition, a second correction signal 17 is determined 12 for the second ultrasonic transducer 4 by subtracting the second ringing debugging signal 16 from the second superimposed signal 15.

In a next step, the flow rate is determined 13 from the first and second correction signals.

Subsequently, the flow measurement is carried out again starting with emitting 9 the measurement signals.

In the illustrated embodiment of the method according to the invention, the ringing debugging signals 16 are unchangeable signals which are detected once before the measurement.

Figure 3:
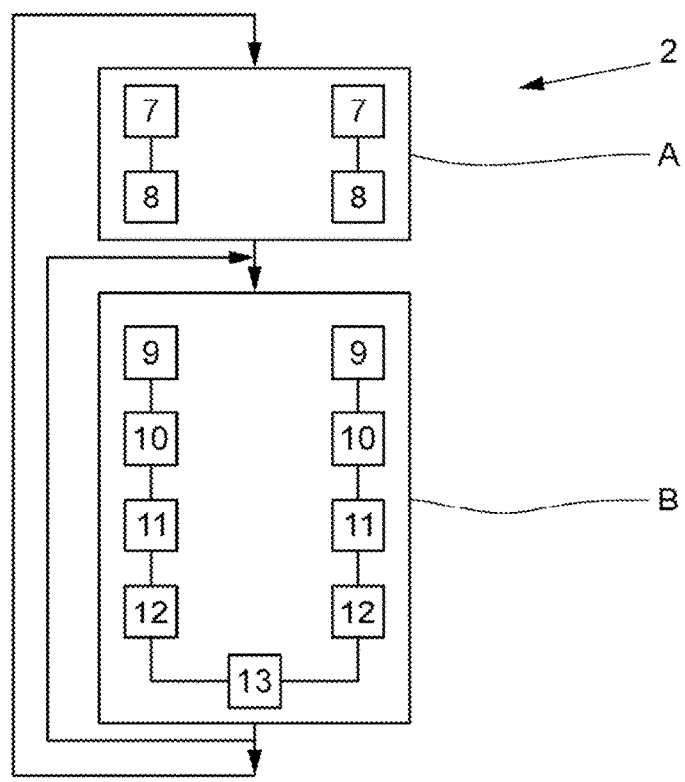
FIG. 3 illustrates a further embodiment of a method according to the invention.

FIG. 3 shows a next embodiment of a method 2 according to the invention. The ultrasonic flowmeter 1 is also designed as shown in FIG. 1, in detail the ultrasonic flowmeter 1 has a first ultrasonic transducer 3 and a second ultrasonic transducer 4, which are operated according to the method 2 according to the invention.

In a first measuring part A, a plurality of first ringing signals of the first ultrasonic transducer 3 are measured 7. Moreover, a first ringing debugging signal 16 is determined by averaging the plurality of first measured ringing signals.

Likewise, a plurality of second ringing signals of the second ultrasonic transducer 4 are measured 7 and a second ringing debugging signal is determined 16 from these measured second ringing signals by averaging them.

Subsequently, the measuring part B is carried out for flow measurement. In this measuring part B, the first ultrasonic transducer 3 emits a first measurement signal 9, producing a first ringing measurement signal in the first ultrasonic transducer 3, and the second ultrasonic transducer 4 emits a second measurement signal 9, producing a second ringing measurement signal in the second ultrasonic transducer 4.

In a next step, the first ultrasonic transducer 3 receives 10 the second measurement signal as a first received signal and the second ultrasonic transducer 4 receives the first measurement signal as a second received signal.

In the first ultrasonic transducer 3, the first received signal and the first ringing measurement signal are superimposed 11, and in the second ultrasonic transducer 4, the second received signal and the second ringing measurement signal are superimposed 11.

Subsequently, by subtracting the first ringing debugging signal 16 from the first superimposed signal 15, a first correction signal 17 from the first ultrasonic transducer is determined 12 and by subtracting the second ringing debugging signal 16 from the second superimposed signal 15, a second correction signal 17 from the second ultrasonic transducer 4 is determined 12.

In a next step, the flow rate is determined 13 from the first correction signal 17 and the second correction signal 17.

The measuring part B is carried out several times according to the illustrated method 2. After the measuring part B has been carried out several times, the measuring part A is run through again at regular or irregular intervals in order to update the first ringing debugging signal 16 and the second ringing debugging signal 16. For this, a further first ringing signal of the first ultrasonic transducer 3 and a further second ringing signal of the second ultrasonic transducer 4 are measured 7. The newly measured first ringing signal is given a particularly high weighting in the subsequent averaging 8 of the plurality of measured first ringing signals for updating the first ringing debugging signal 16. The newly measured second ringing signal is given a particularly high weighting in the subsequent averaging 8 of the plurality of measured second ringing signals for updating the second ringing debugging signal 16.

In the subsequent measuring part B, the respectively updated first or second ringing debugging signal 16 is now used as a basis for determining the first or second correction signal 17.

Figure 4:
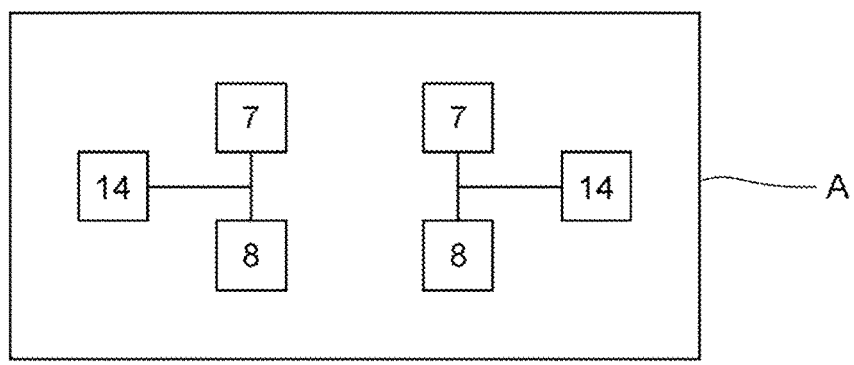
FIG. 4 illustrates a further embodiment of a method according to the invention.

FIG. 4 shows a further embodiment of the measuring part A for updating the first or the second ringing debugging signal 16. As previously described, a first ringing signal of the first ultrasonic transducer 3 and a second ringing signal of the second ultrasonic transducer 4 are initially determined. The first newly measured ringing signal is now evaluated separately 14. In detail, the newly measured ringing signal is compared with a signal stored in the control and evaluation unit 6 with regard to changes. In addition, the newly measured second ringing signal is compared with a signal stored in the control and evaluation unit 6 with regard to changes.

For example, the newly measured first ringing signal is compared with the stored first ringing debugging signal 16 and the newly measured second ringing signal is compared with the stored second ringing debugging signal 16.

For this, a frequency analysis of the first newly measured ringing signal or of the second newly measured ringing signal is carried out and at least one comparison parameter is derived from the frequency spectrum in each case. The value of the comparison parameter is compared with the corresponding value of the comparison parameter of the frequency spectrum derived from the first ringing debugging signal 16 or from the second ringing debugging signal 16. A change in the value of the comparison parameter is indicative of a change in the state of the ultrasonic transducer and/or indicative of a change in process conditions. Particularly preferably, in the event of a change in the comparison parameter, a corresponding message is output to the user.

Figure 5:
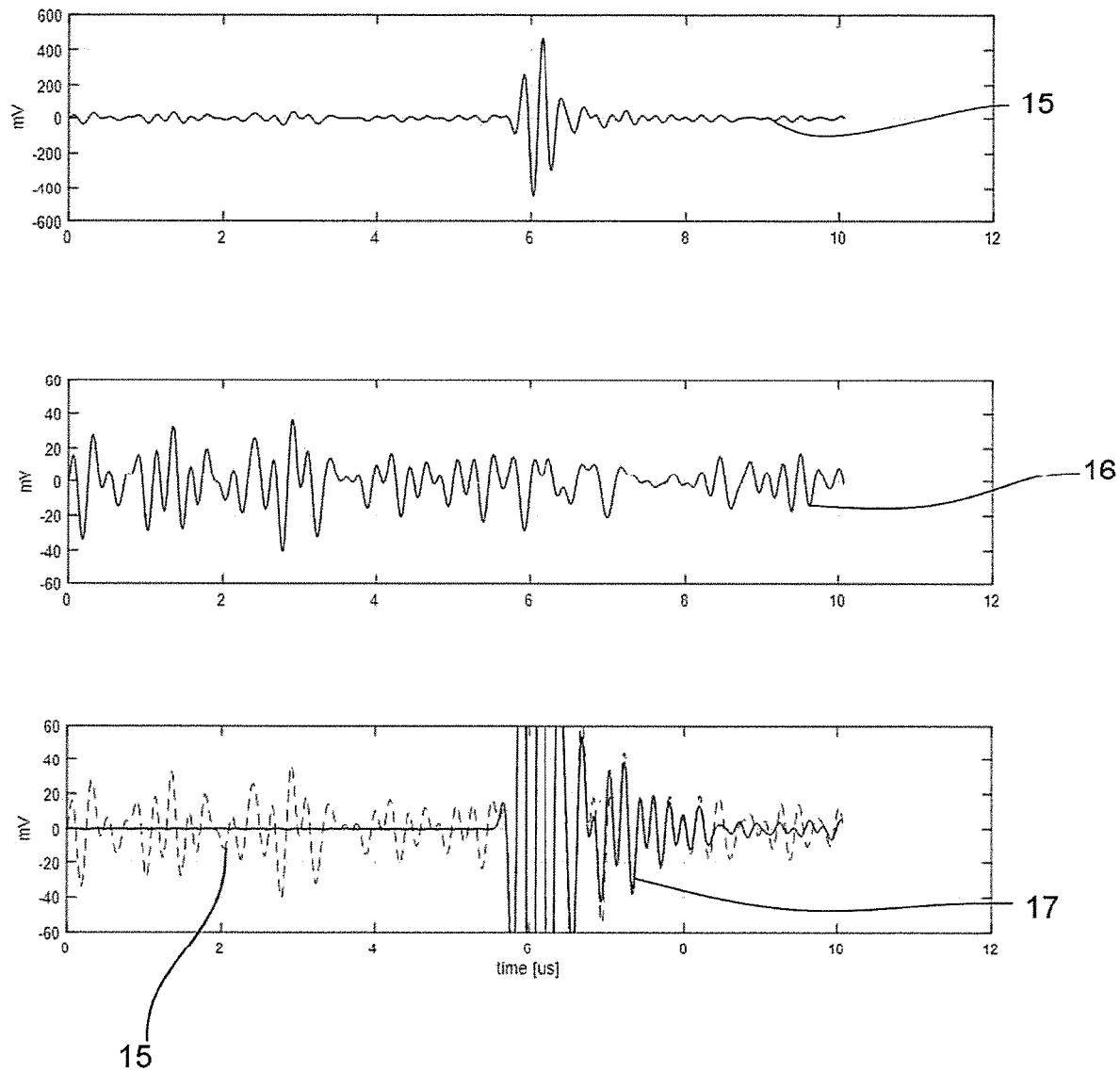
FIG. 5 illustrates a graphical representation of a measurement signal correction.

In FIG. 5, an embodiment of the ringing signals relevant in the context of the present invention is shown. In the upper diagram, an embodiment of a superimposed signal is shown, which has a superimposition of a ringing measurement signal and a receive signal.

In the middle diagram, a ringing signal defining a ringing debugging signal 16 is shown.

The superposition signal 15 and the correction signal 17 resulting from subtracting the ringing debugging signal 16 from the superposition signal are both in the lower diagram.

In the middle and lower diagrams, a different vertical scaling has been selected compared to the upper diagram in order to better display the signal.

Figure 6:
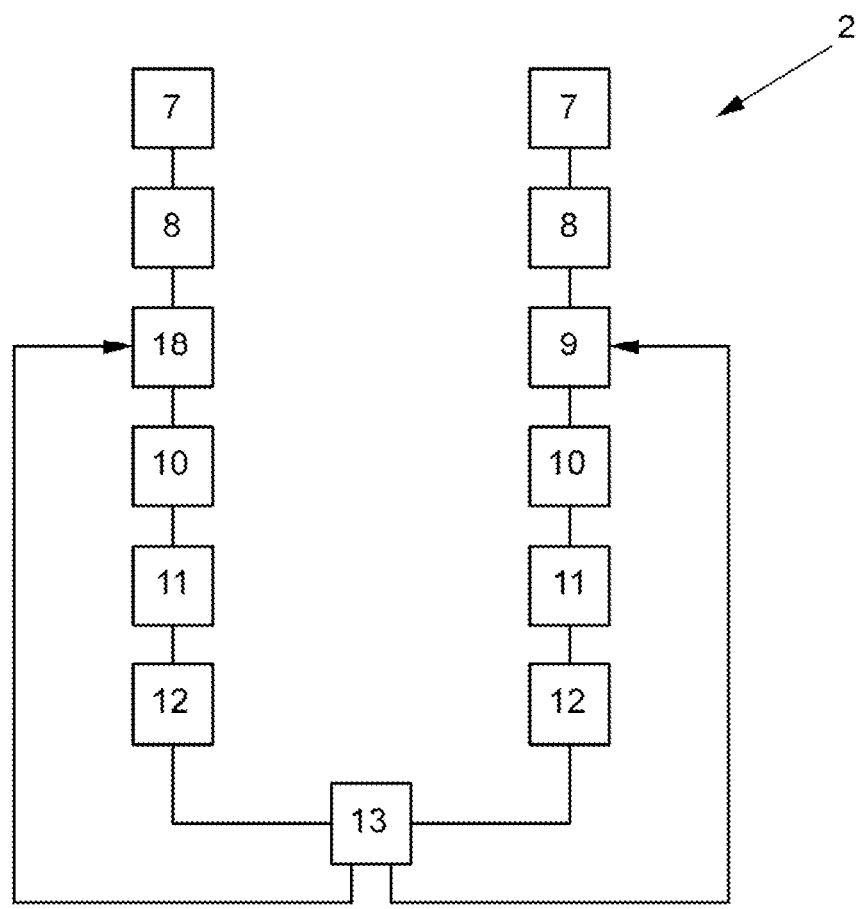
FIG. 6 illustrates a further embodiment of a method according to the invention.

FIG. 6 shows a further example of a method 2 according to the invention. Here, the ultrasonic flowmeter 1 is designed as shown in FIG. 1. The illustrated method 2 takes into account that even after the correction signal 17 has been determined, the correction signal may contain an interfering signal based, for example, based on the limited sampling rate/resolution.

First, as already described, at least one first ringing signal of the first ultrasonic transducer 3 and at least one second ringing signal of the second ultrasonic transducer 4 are determined 7. A first ringing debugging signal 16 is determined 8 from the at least one first ringing signal and a second ringing debugging signal 16 is determined 8 from the at least one second ringing signal.

In the subsequent flow measurement 18, the first ultrasonic transducer 3 emits a first measurement signal with a time delay +T compared to when the second measurement signal is emitted by the second ultrasonic transducer 4.

In the subsequent flow measurement, the first ultrasonic transducer 3 emits the first measurement signal at a time before the second measurement signal is emitted by the second ultrasonic transducer 4.

This has the effect that, at the second ultrasonic transducer 4, the second interference signal is superimposed with the second correction signal at the same points both positively and negatively, so that the remaining interference signal is averaged out over a plurality of measurements.

The measurement accuracy of the illustrated embodiment is thus particularly high.

Figure 7:
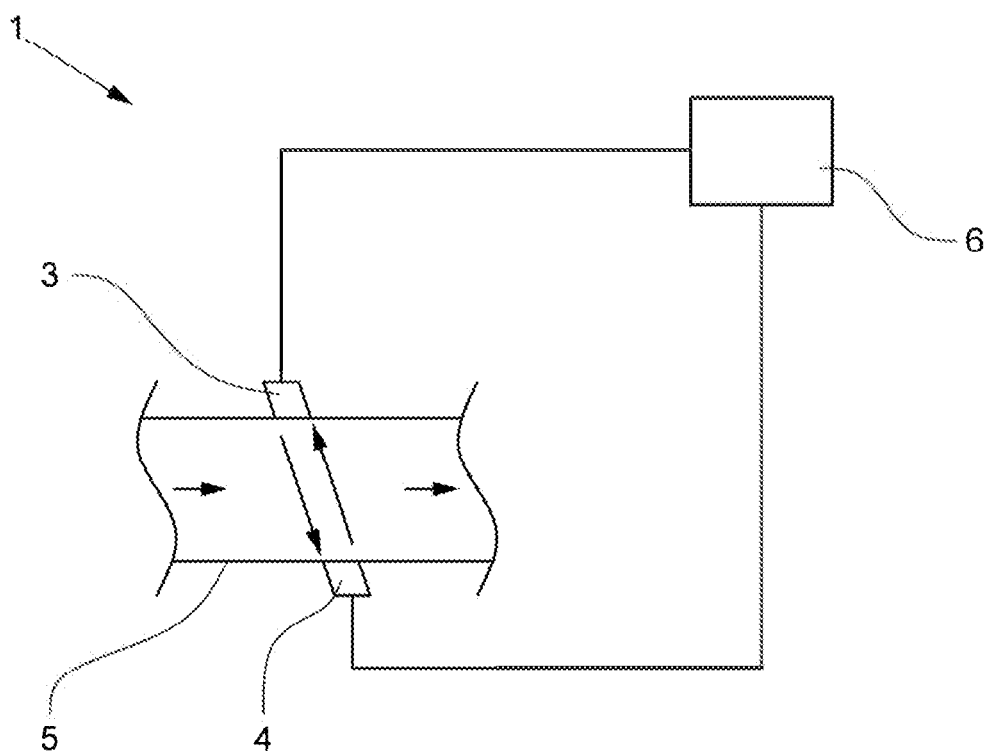
FIG. 7 illustrates a further embodiment of an ultrasonic flowmeter.

FIG. 7 shows another embodiment of an ultrasonic flowmeter 1. In contrast to the embodiment shown in FIG. 1, the ultrasonic flowmeter 1 has an ultrasonic transducer 3 which is designed both as a transmitting unit and as a receiving unit and which is operated using the method according to the invention. Furthermore, the ultrasonic flowmeter 1 has a second ultrasonic transducer 4, which is designed only as a receiver and which reflects the measurement signal emitted by the first ultrasonic transducer 3.

All of the previously described embodiments of the method according to the invention can likewise be carried out with only the first ultrasonic transducer 3. In this respect, with regard to the specific embodiments of the method 2 according to the invention in connection with the ultrasonic flowmeter 1 shown in FIG. 7, reference is made to a respective method sequence of the methods described in FIGS. 2 to 4 and 6.

The invention claimed is:

1. A method for operating an ultrasonic flowmeter, wherein the ultrasonic flowmeter has at least one first ultrasonic transducer designed as a transmitting unit and as a receiving unit, a measuring tube through which a medium flows during operation, and a control and evaluation unit for controlling at least the first ultrasonic transducer and for determining the flow velocity or the flow rate of the medium, the method comprising:

capturing at least one first ringing signal of the first ultrasonic transducer and detecting a first ringing debugging signal based on the at least one captured first ringing signal;

emitting a first measurement signal into the medium through the first ultrasonic transducer, resulting in a first ringing measurement signal in the first ultrasonic transducer;

receiving a measurement signal as a first received signal by the first ultrasonic transducer, wherein the first received signal and the first ringing measurement signal are superimposed to form a first superimposed signal;

determining a first correction signal by subtracting the first ringing debugging signal from the first superimposed signal; and determining the flow velocity or flow rate based on the first correction signal.

2. The method according to claim 1, wherein the ultrasonic flowmeter includes at least a first ultrasonic transducer and a second ultrasonic transducer;

wherein the first ultrasonic transducer and the second ultrasonic transducer are formed as a transmitting unit and as a receiving unit, respectively;

wherein the first ultrasonic transducer and the second ultrasonic transducer are arranged on the measuring tube offset with respect to each other in the flow direction; and wherein the method further comprises:

capturing at least one first ringing signal of the first ultrasonic transducer and detecting a first ringing debugging signal based on the at least one captured first ringing signal; and/or capturing at least one second ringing signal of the second ultrasonic transducer and determining a second ringing debugging signal based on the at least one detected second ringing signal;

emitting a first measurement signal into the medium by the first ultrasonic transducer, wherein a first ringing measurement signal is generated in the first ultrasonic transducer;

emitting a second measurement signal into the medium by the second ultrasonic transducer, wherein a second ringing measurement signal is generated in the second ultrasonic transducer;

receiving the second measurement signal as a first received signal by the first ultrasonic transducer, wherein the first received signal and the first ringing measurement signal are superimposed to form a first superimposed signal;

receiving the first measurement signal as a second received signal by the second ultrasonic transducer, wherein the second received signal and the second ringing measurement signal are superimposed to form a second superimposed signal;

determining a first correction signal by subtracting the first ringing debugging signal from the first superimposed signal; and/or determining a second correction signal by subtracting the second ringing debugging signal from the second superimposed signal; and determining the flow velocity or flow rate based on the first and/or the second correction signal.

3. The method according to claim 2, wherein the first ultrasonic transducer and the second ultrasonic transducer emit the first measurement signal and the second measurement signal simultaneously.

4. The method according to claim 1, wherein during a measurement, the first ringing debugging signal of the first ultrasonic transducer and/or the second ringing debugging signal of the second ultrasonic transducer is updated at predetermined intervals.

5. The method according to claim 1, wherein the first ringing debugging signal corresponds to an averaging over a plurality of individual measurements of first ringing signals of the first ultrasonic transducer; and/or wherein the second ringing debugging signal corresponds to an averaging over a plurality of individual measurements of second ringing signals of the second ultrasonic transducer.

6. The method according to claim 5, wherein, in order to update the first ringing debugging signal of the first ultrasonic transducer, the first ringing signal is captured anew during a measurement using a point in time at which the second ultrasonic transducer does not generate any measurement signals;

wherein the first ringing debugging signal is updated taking into account the newly captured first ringing signal and/or, in order to update the second ringing debugging signal of the second ultrasonic transducer, the second ringing signal is newly captured during a measurement using a point in time at which the first ultrasonic transducer is not generating measurement signals; and wherein the second ringing debugging signal is updated taking into account the newly captured second ringing signal.

7. The method according to claim 5, wherein, in order to update the first ringing debugging signal, the averaging of a plurality of individual measurements is redetermined taking into account the newly captured first ringing signal; and/or wherein, in order to update the second ringing debugging signal, the averaging of a plurality of individual measurements is redetermined taking into account the newly captured second ringing signal.

8. The method according to claim 1, wherein the at least one newly captured first ringing signal of the first ultrasonic transducer and/or the at least one newly captured second ringing signal of the second ultrasonic transducer is/are evaluated, in particular with regard to the state of the first ultrasonic transducer or the second ultrasonic transducer.

9. The method according to claim 8, wherein a frequency analysis of the at least one newly captured first ringing signal and/or of the at least one newly captured second ringing signal is carried out;

wherein a comparison parameter is derived from the frequency spectrum of the first ringing signal and/or from the frequency spectrum of the second ringing signal; and wherein the value of the comparison parameter is compared with values stored in the control and evaluation units for the first ringing signal and/or for the second ringing signal.

10. The method according to claim 1, wherein the first correction signal has a first interference signal and/or the second correction signal has a second interference signal;

wherein the first ultrasonic transducer receives the measurement signal with a varying time offset ±T in the course of the measurement, so that the first interference signal overlays the first correction signal both positively and negatively at the same points in the course of the measurement; and/or wherein the second ultrasonic transducer receives the measurement signal with a varying time offset ±T in the course of the measurement so that the second interference signal overlays the second correction signal both positively and negatively at the same points in the course of the measurement.

11. The method according to claim 10, wherein the first ultrasonic transducer emits the first measurement signal with a varying time offset ±T with respect to the emission of the second measurement signal, so that the first measurement signal has a time offset ±T with respect to the second ringing measurement signal of the second ultrasonic transducer; and/or wherein the second ultrasonic transducer emits the second measurement signal with a varying time offset ±T with respect to the emission of the first measurement signal, so that the second measurement signal has a time offset ±T with respect to the first ringing measurement signal of the first ultrasonic transducer.

12. The method according to claim 10, wherein the time offset T between the emission of the first and the second measurement signal corresponds to a half period of the first or the second measurement signal, respectively.

13. The method according to claim 11, wherein the first ultrasonic transducer emits the first measurement signal alternately delayed, and temporally before the emission of the second measurement signal; or wherein the second ultrasonic transducer emits the second measuring signal alternately delayed, and temporally before the emission of the first measuring signal.

14. An ultrasonic flowmeter, comprising:

at least one first ultrasonic transducer, wherein the first ultrasonic transducer is designed as a transmitting unit and as a receiving unit; and a measuring tube, wherein a medium flows through the measuring tube during operation; and a control and evaluation unit for controlling at least the first ultrasonic transducer and for determining the flow velocity or the flow rate of the medium;

wherein the ultrasonic flowmeter is designed to carry out a method including:

capturing at least one first ringing signal of the first ultrasonic transducer and detecting a first ringing debugging signal based on the at least one captured first ringing signal;

emitting a first measurement signal into the medium through the first ultrasonic transducer, resulting in a first ringing measurement signal in the first ultrasonic transducer;

receiving a measurement signal as a first received signal by the first ultrasonic transducer, wherein the first received signal and the first ringing measurement signal are superimposed to form a first superimposed signal;

determining a first correction signal by subtracting the first ringing debugging signal from the first superimposed signal; and determining the flow velocity or flow rate based on the first correction signal.

\* \* \* \* \*